Jan. 13, 1942.    C. E. SORENSEN    2,269,492
METHOD OF MAKING STEERING WHEELS
Filed June 16, 1939
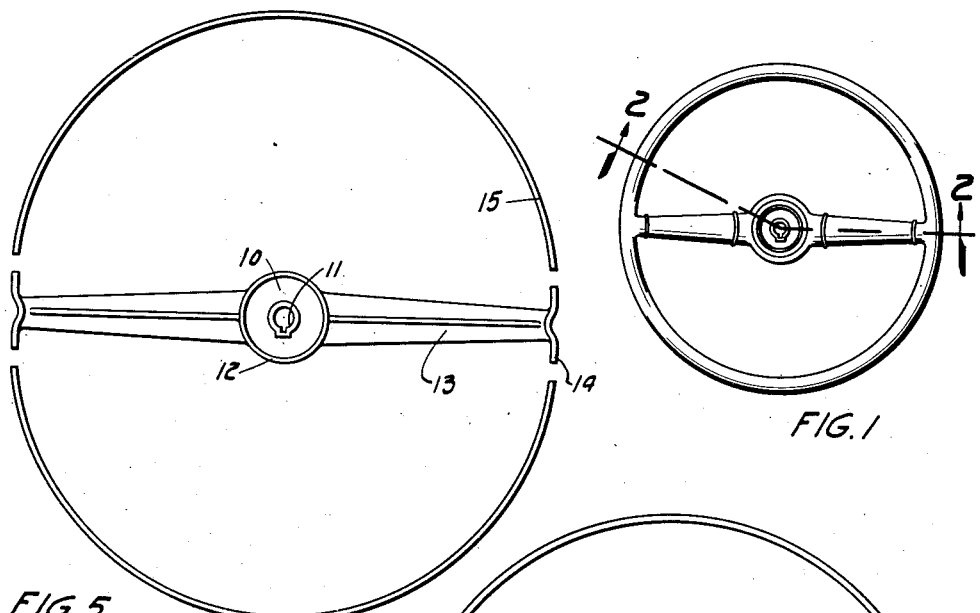
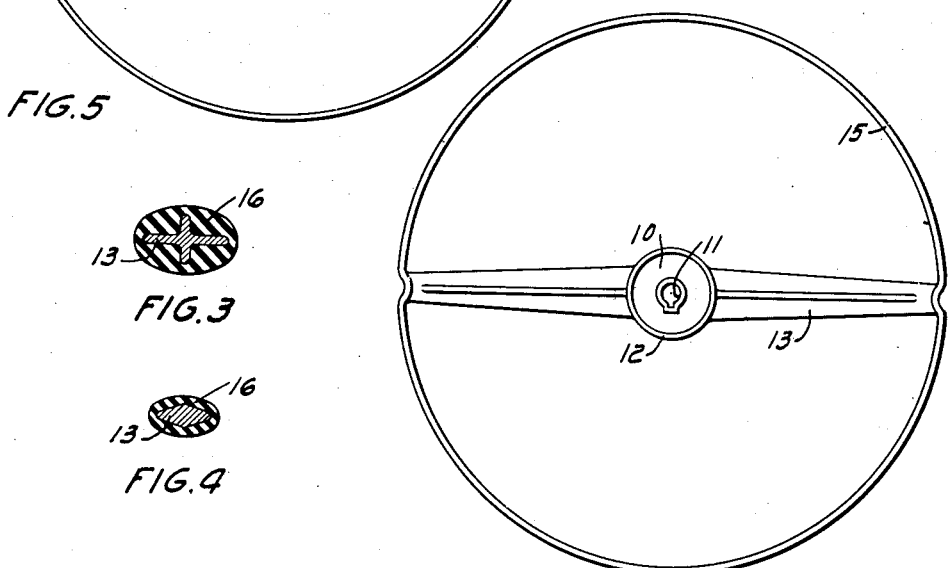
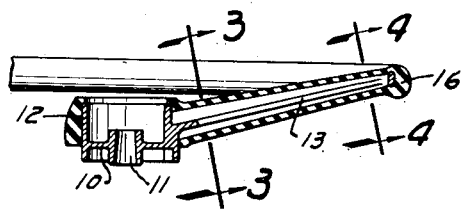
INVENTOR
C. E. Sorensen
Edwin C. McRae
E. L. Davis
ATTORNEYS Patented Jan. 13, 1942

2,269,492

UNITED STATES PATENT OFFICE 2,269,492

METHOD OF MAKING STEERING WHEELS

Charles E. Sorensen, Detroit, Mich., assignor to Ford Motor Company, Dearborn, Mich., a corporation of Delaware Application June 16, 1939, Serial No. 279,511

1 Claim. (Cl. 219—10)

The object of my invention is to provide a method of making a steering wheel construction which is of simple, durable and inexpensive construction.

A further object of my invention is to provide a method of making a steering wheel construction which may be more economically manufactured than steering wheels now generally in use.

Still a further object of my invention is to provide a method of making a steering wheel construction which possesses maximum strength and rigidity for turning movement but which will be considerably more flexible than the conventional type of wheel in absorbing impact loads against the rim. The advantage of this construction arises if a person is thrown against the wheel, at which time the load is absorbed by the deflection of the wheel rim. However, the maximum force that the driver can deliver in turning the wheel is rigidly resisted by the construction.

A further object of my invention is to provide a method of making a steering wheel formed of a relatively simple hub and spoke casting to which a pair of semi-circular rim reinforcements, such reinforcements representing a circular arc of approximately 180° as shown in Figure 5, are buttwelded to form the completed wheel reinforcing structure. Aside from a few simple machine operations on the hub, it is only necessary to butt weld the two rim reinforcements to complete the assembly. This requires only a fraction of the work formerly required in riveting the spokes to the rim or in other constructions known to the applicant.

With these and other objects in view, my invention consists in the arrangement, construction and combination of the various parts of my improved device, as described in this specification, claimed in my claim and illustrated in the accompanying drawing, in which:

Figure 1 is a plan view of my improved wheel construction.

Figure 2 is a sectional view, taken upon the line 2—2 of Figure 1.

Figure 3 is a sectional view, taken upon the line 3—3 of Figure 2.

Figure 4 is a sectional view, taken upon the line 4—4 of Figure 2.

Figure 5 is a plan view of the wheel reinforcing members before they are welded together, and Figure 6 is a view of the reinforcing members, shown in Figure 5, after they have been welded together.

Referring to the accompanying drawing, I have used the reference numeral 10 to indicate a hub member having a tapered bore 11 formed in the central portion thereof. The hub 10 is formed in the center of a cup-shaped member 12. A pair of diametrically opposed arms 13 extend radially from opposite sides of the cup member 12, the arms 13, cup member 12 and the hub 10 being formed as an integral steel casting. It will be noted from Figures 3 and 4 that the arms 13 are cast with an X-shaped cross-section so as to secure maximum strength with minimum weight.

The outer end of each of the arms 13 is cast with a pair of ears 14 which project a short distance circumferentially in each direction from the arm 13. In order to complete the wheel reinforcing, a pair of circular shaped reinforcements 15 are bent up from oval shaped wire. The ends of each reinforcement are then buttwelded to the circumferentially adjacent ears 14 to form a complete circular rim which is fixedly united to the spokes 13. It is well known that in an electrical butt-weld, portions of the abutting welded surfaces are consumed in what is referred to as the flash. Thus, when two elements of certain initial dimension are buttwelded, their combined final dimension will be less than the sum of their initial dimensions. For this reason, butt-welding of a conventional three or four segment wheel with radial spokes is exceedingly difficult in view of the compensation that must be made for changes in dimension and alignment during the welding process.

This reinforcing structure possesses marked improvements and commercial advantages over the conventional wheel structure. Heretofore, all such wheel reinforcements have required numerous rivets or other connections, a separate hub and a separate rim member.

After the hub and rim reinforcements are welded, the unit is placed in a mold and a covering 16 of hard rubber, phenol condensate or similar plastic, is molded around the rim and spokes just described. The composition of the covering 16 is not important as any one of a dozen different plastics now in use in suitable therefor. The wheel reinforcing member comprises the novelty of this invention.

Among the many advantages arising from the use of my invention, it may be well to mention that the provision of two relatively large spokes cast integrally with the hub provides means for rigidly resisting torsional flexing between the hub and rim, while the provision of relatively small half circular reinforcements which extend around the outer edge of the rim provides a resilient means for absorbing lateral loads upon the rim. The normal position of the wheel when the car is being driven straight ahead is shown in Figure 1 of the drawing, from which it will be seen that should the car be stopped suddenly so that the driver is forced against the lower portion of the wheel, his body will strike against the bottom section of the rim and it being flexible the impact load thereof will be absorbed thereby, causing less damage to both the wheel and the person than would be caused by a conventional rigid wheel.

Some changes may be made in the arrangement, construction and combination of the various parts of my improved construction without departing from the spirit of my invention and it is my intention to cover by my claim such changes as may be reasonably included within the scope thereof.

I claim as my invention:

The method of forming an automobile steering wheel which comprises the steps of forming an integral central member including a hub, a pair of opposed radial arms extending therefrom, and a pair of ears extending circumferentially from the extreme outer end of each of said arms, forming a pair of wire reinforcements to arcuate shapes, said reinforcements extending through substantially 180° of arc, arranging one of said reinforcements on each side of said central member so that opposite ends of said reinforcements are in contact with the opposite ears on each side of said central member, impressing forces on said reinforcements substantially in the line of said extending ears tending to maintain such contact throughout the welding operation and applying a suitable butt-welding current to said reinforcements and said central member, whereby said reinforcements and said central member are joined together and abutting portions of said reinforcements and said ears are consumed as flash in said welding operation, the extent of said ears being so proportioned that after such diminution due to flash, the resultant wheel is substantially circular.

CHAS. E. SORENSEN.